Figure 1:
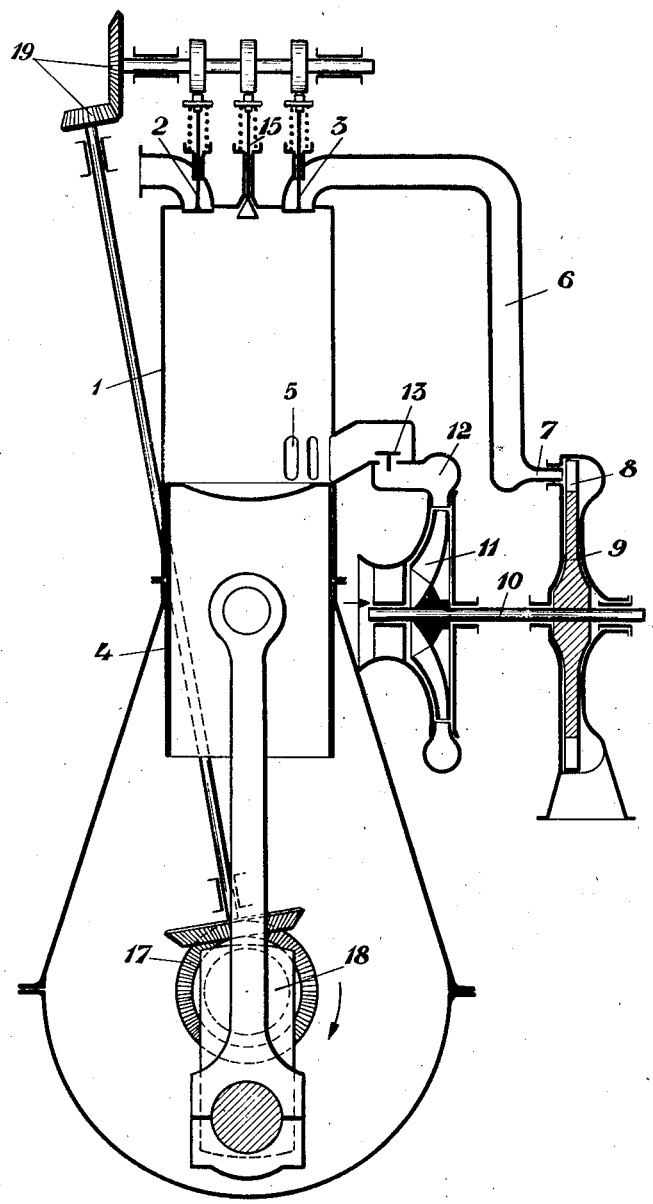

June 19, 1934.  M. DU BOIS  1,963,780
INTERNAL COMBUSTION ENGINE POWER UNIT
Filed March 2, 1931  2 Sheets-Sheet 1

June 19, 1934.  M. DU BOIS  1,963,780
INTERNAL COMBUSTION ENGINE POWER UNIT
Filed March 2, 1931   2 Sheets-Sheet 2
Fig.2   Fig.3   Fig.4   Fig.5
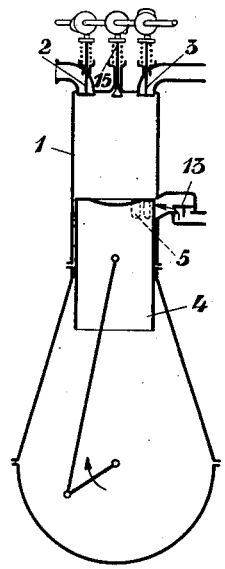 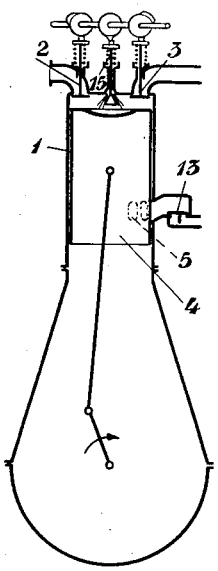 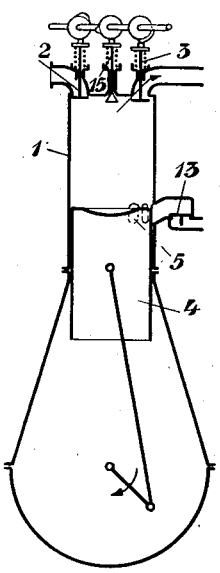 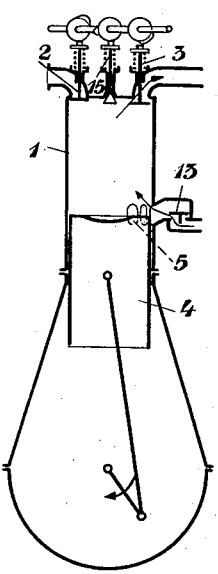
Fig.6   Fig.7   Fig.8   Fig.9
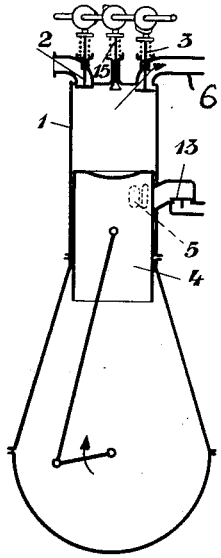 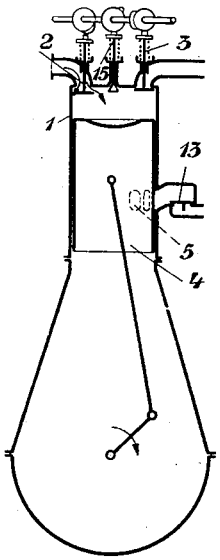 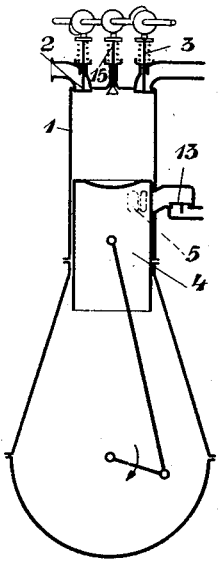 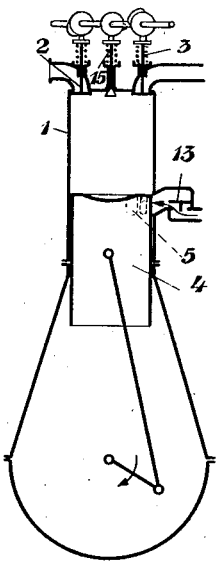

UNITED STATES PATENT OFFICE 1,963,780

INTERNAL COMBUSTION ENGINE POWER UNIT

Marcel du Bois, Winterthur, Switzerland

Application March 2, 1931, Serial No. 519,390
In Switzerland October 29, 1930

2 Claims. (Cl. 60—13)

This invention relates to internal combustion engine power units of the type comprising a four-stroke internal combustion engine and an air compressor driven by a waste gas turbine.

Power units of this general type are open to the disadvantage that the required quanity of waste gases is not always available just at the time when it is required, the energy of the waste gases being too small as compared with the work necessary for the compression of the supercharging air. This disadvantage is more particularly noticeable when the power unit is subjected to relatively large fluctuations of load and in order to obviate this disadvantage it has been proposed to increase the supercharging pressure which, however, has resulted in further disadvantages such as an increase of power required from the compressor.

According to this invention the air admitted into the engine cylinder is drawn into the cylinder during a part of the suction stroke of the engine by the pumping action of the engine piston through one or more valve-controlled inlet openings at the upper end of the cylinder, whilst the rest of the air is introduced at the end of the suction stroke and at the beginning of the compression stroke through ports in the wall of the cylinder uncovered by the piston towards the end of the suction stroke.

Part of the work necessary for supplying the air is thus done by the piston of the internal combustion engine thereby reducing not only the power required to drive the compressor and therefore its size but also the total work necessary for supplying the air.

One construction of power unit according to the present invention is illustrated diagrammatically in the accompanying drawings, in which, Fig. 1 is a cross-section of the internal combustion engine, the waste-gas turbine, and the air compressor, and Figs. 2 and 9 show the cam and valve positions in connection with different piston positions during a cycle.

In the construction illustrated the piston 4 of the internal combustion engine reciprocates within the cylinder 1 having at one end an air inlet valve 2 and towards its other end additional air inlet ports 5. A pipe 6 communicates at one end with the exhaust port controlled by the valve 3 and is provided at its other end with a nozzle 7 arranged adjacent to the blades 8 of a turbine rotor 9 keyed to a shaft 10. Similarly keyed to the shaft 10 is a compressor 11 adapted to draw air from the atmosphere and compress it in a chamber or manifold 12 which communicates through a non-return valve 13 with the air inlet ports 5.

After combustion has taken place in the cylinder 1 the exhaust valve 3 is opened so that the waste gases pass through the exhaust pipe 6 and from the nozzle 7 on to the blades 8 of the turbine 9 which thus drives the compressor 11. The compressor 11 draws air from the atmosphere and pumps it into the manifold 12 so that as soon as the pressure of the waste gases within the cylinder 1 drops below the pressure of the supercharging air in the manifold 12 the non-return valve 13 will open and air will flow through the ports 5 into the cylinder 1 so as to provide a layer of fresh air between the piston 4 and such waste gases as remain in the cylinder. The piston 4 is now in the position shown in the drawing and as it rises on the exhaust stroke it first closes the ports 5 and drives the remaining waste gases through the exhaust valve 3 into the pipe 6. Thus when the piston arrives at its upper dead centre a layer of fresh air only lies above the piston.

The exhaust valve 3 is now closed and the air inlet valve 2 opened so that as the piston descends on its suction stroke air is drawn through the air inlet port controlled by the valve 2. Before the piston 4 has completed the suction stroke the air valve 2 is closed whereupon continued downward movement of the piston causes a drop of pressure within the cylinder 1. The piston now uncovers the ports 5 and as the air compressed within the manifold 12 is at greater pressure than that contained within the cylinder 1 the non-return valve 13 is raised and air flows into the cylinder until the piston 4 has again risen on the compression stroke sufficiently to cover the ports 5. The pre-compressed air now contained in the cylinder 1 is further compressed by the piston as this rises until the pressure of the air within the cylinder is sufficient for ignition of the fuel i. e. when the piston approaches the top dead centre. Fuel is now injected into the cylinder and the above sequence is repeated.

Figs. 2 to 9 show various operating positions. In Fig. 2, the piston 4 has closed ports 5 and the air present in the cylinder is compressed. Inlet valve 2 and exhaust valve 3 are closed. A short distance before reaching the upper dead center position, the fuel valve 15, Fig. 3, is opened. After combustion, the outlet valve 3 is opened, Fig. 4, so that the charging air flows through the now opened check valve 13 and the ports 5 into the working chamber, Fig. 5 through the outlet valve 3 into the exhaust conduit 6, Fig. 6, after closing the outlet valve 3 the air inlet valve 2 is opened, Fig. 7. The air inlet valve 2 closes after the piston covers a certain portion of the suction, Fig. 8 and as soon as the controlling edge of the piston lays bare the slots 5, Fig. 9, the valve 13 lifts.

It will be seen that with an internal combustion engine power unit according to the present invention the total work required for supercharging is reduced so that not only can a compressor of relatively small capacity be employed but this compressor can be driven solely by waste gases without any separate supplementary source of power. This advantage is particularly apparent when the power unit is accelerated rapidly i. e. when the energy at first available from the exhaust gases is relatively small, such energy having hitherto proved insufficient to supply the increased power which is necessary for supercharging during acceleration. Thus when an increased supply of combustion air is necessary this can be supplied by the energy of the waste gases alone without the power unit taking an excessive time to reach the required speed.

I claim:

1. In an internal-combustion-engine power unit including a four-cycle such engine, an exhaust-gas driving turbine, and an air-compressor driven thereby; valve-controlled inlet openings at the upper end of the cylinder adapted to admit part of the air during part of the suction stroke of the engine by the pumping-action of the engine-piston, ports in the cylinder-wall adapted to be uncovered by the piston near the end of the suction stroke for introducing the rest of the air only at the end of the suction stroke and the beginning of the compression stroke, and means for prematurely closing some of the air-admission members during the suction-action of the piston near the end of the working-stroke, whereby to produce a partial-vacuum in order to lessen the air-feeding work performed by the exhaust-gas turbine to thereby utilize more fully the amount of exhaust-gas available for the turbine.

2. In an internal-combustion-engine power unit including a four-cycle such engine, an exhaust-gas driving turbine, and an air-compressor driven thereby; valve-controlled inlet openings at the upper end of the cylinder adapted to admit part of the air during part of the suction stroke of the engine by the pumping-action of the engine-piston, ports in the cylinder-wall adapted to be uncovered by the piston near the end of the suction stroke for introducing the rest of the air only at the end of the suction stroke and the beginning of the compression stroke, and means for prematurely closing some of the air-admission members during the suction-action of the piston near the end of the working stroke, whereby to produce a partial-vacuum in order to lessen the air-feeding work performed by the exhaust-gas turbine to thereby utilize more fully the amount of exhaust-gas available for the turbine, said air-compressor having means for introducing the balance of the air into the cylinder only when the suction stroke ends and the compression stroke begins.

MARCEL DU BOIS.